(12) United States Patent
Boyer et al.

(10) Patent No.: US 10,650,347 B1
(45) Date of Patent: May 12, 2020

(54) LABWARE INVENTORY TRACKING AND POSITIONING DEVICE

(71) Applicant: Innovative Technology Ventures LLC, Middletown, DE (US)

(72) Inventors: Robert Boyer, Middletown, DE (US); Brandon Boyer, Townsend, DE (US)

(73) Assignee: MDIP Licensing, LLC, Middletown, DE (US)

( * ) Notice: Subject to any disclaimer, the term of this patent is extended or adjusted under 35 U.S.C. 154(b) by 0 days.

(21) Appl. No.: 16/190,491

(22) Filed: Nov. 14, 2018

Related U.S. Application Data

(60) Provisional application No. 62/587,069, filed on Nov. 16, 2017.

(51) Int. Cl.
*G06Q 10/08* (2012.01)
*G06K 7/10* (2006.01)

(52) U.S. Cl.
CPC ....... *G06Q 10/087* (2013.01); *G06K 7/10366* (2013.01)

(58) Field of Classification Search
CPC .......... G06Q 10/087; G06K 7/10366
See application file for complete search history.

(56) References Cited

U.S. PATENT DOCUMENTS 7,996,107 B2 * 8/2011 Gueller ................. G01G 17/06
700/240

* cited by examiner

*Primary Examiner* — Sonji N Johnson
(74) *Attorney, Agent, or Firm* — Rogowski Law LLC

(57) ABSTRACT

A labware inventory tracking and positioning device includes a plurality of labware carriers placed on the top surface of a deck. Each carrier has a permanent magnet therein or thereon. Below the deck, a cursor has a top part that is movable with respect to its bottom part. A permanent magnet, surrounded by a coil, is held in a compartment of the bottom part. Applying current through the coil in a first direction pushes up the cursor permanent magnet to push up the cursor top part into contact with the bottom of the deck, magnetically coupling one of the carrier magnets to the cursor magnet. Once so coupled, the carrier follows the X- and Y-direction movement of the cursor. Applying current in the opposite direction pulls the cursor permanent magnet down to decouple the cursor magnet from the carrier magnet.

19 Claims, 8 Drawing Sheets

LABWARE INVENTORY TRACKING AND POSITIONING DEVICE

CROSS-REFERENCE TO RELATED APPLICATION

This application claims priority under 35 USC § 119(e) to U.S. Provisional Application Ser. No. 62/587,069, entitled "Lab Ware Inventory Tracking and Positioning Device", filed Nov. 16, 2017, the disclosure of which is incorporated by reference herein.

FIELD OF THE INVENTION

The present invention relates to a labware inventory tracking and positioning device in which carriers for labware are moved to desired locations on a deck surface by a movable cursor disposed below the deck surface, wherein the cursor selectively magnetically couples to and decouples from individual carriers selected for movement.

BACKGROUND OF THE INVENTION

In research laboratories, multiple samples are stored in individual test tubes, microplates or troughs, and must be moved from one location to a next location within the laboratory, without spilling their contents and without cross-contamination. The multiple samples also are indexed and inventoried. With automated specimen processing, it is an objective to track the contents of a laboratory vessel from the initial vessel loading through all testing protocols and inventorying, preferably limiting handling by laboratory personnel. Improvements to systems to safely move each laboratory vessel, while tracking its contents and location in real time, continue to be sought.

SUMMARY OF THE INVENTION

A lab ware inventory tracking and positioning device has multiple carriers for receiving labware items disposed for sliding movement on a deck having a planar or substantially planar top deck surface with a desired coefficient of friction. In a preferred embodiment the deck surface is formed of acetal.

Each carrier has a magnet thereon or disposed in a recess or cavity in its surface adjacent the top deck surface. The magnet preferably is a permanent magnet, such as a neodymium magnet. The carriers may be of different configurations or shapes to hold various lab ware, including, but not limited to, test tubes, tubes, microplates, trough-type vessels, and disposable tips.

First and second guide bars are disposed below the bottom surface of the deck, with the second guide bar positioned perpendicularly to the first guide bar. A cursor is joined for movement along at least a portion of the length of the first guide bar (in the Y-direction). A first motor is coupled to the cursor or a carriage therefor for controlling X-direction movement of the cursor along the second guide bar, and a second motor is coupled to the cursor or the carriage therefor for controlling Y-direction movement of the cursor along the first guide bar. The first and second motors each may be stepper motors.

The cursor has a top part disposed over a bottom part. The top part faces the bottom surface of the deck. The top part is vertically movable between a push position and a pull position. The top part of the cursor defines a first cavity therein to receive a top portion of a cursor magnet. The bottom part of the cursor defines a second cavity to receive the cursor magnet and a coil around a bottom portion of the cursor magnet. The first cavity in the top part of the cursor is sized differently from the second cavity in the bottom part of the cursor, such that the coil around the bottom portion of the cursor magnet does not fit into the first cavity in the top part. The top part of the cursor contacts the bottom surface of the deck when in the push position, but is spaced apart from the bottom surface of the deck defining a gap between the top part of the cursor and the bottom surface of the deck when the cursor is in the pull position.

The cursor magnet preferably is a permanent magnet, such as a neodymium magnet.

A source of electrical current directs current through the coil in a first direction (for the push position), and may direct current through the coil in a reverse direction (for the pull position). The cursor magnet and the carrier magnet of the selected carrier experience magnetic field attraction force through the thickness of the deck when the cursor is in the push position, and the selected carrier is movable upon the top deck surface in X-Y directions in direct relation to position(s) of the cursor in X-Y directions below the deck. The cursor magnet and the selected carrier magnet experience magnetic field repulsive force when the cursor is in the pull position, such that the carrier no longer is movable in direct relation to the positions of the cursor below the deck.

In a preferred embodiment, a material of desired coefficient of friction is applied onto or joined to the top part of the cursor. One suitable material of desired low coefficient of friction is acetal. In another preferred embodiment, a focus device is present on the cursor to concentrate magnetic field to the deck.

The lab ware inventory tracking and positioning device according to the invention may also include a cooling device to cool the coil held in the cursor. One exemplary cooling device is a closed liquid loop fluidly connect to a fan cooled radiator.

In one preferred embodiment, an RFID device is embedded in or attached to the at least one carrier, and an RFID reader is associated with the cursor. In another preferred embodiment, a camera is disposed above the top deck surface to collect imaged inventory data.

In yet another preferred embodiment, an extender may be removably attachable to the deck to extend either the length or the width of the deck.

BRIEF DESCRIPTION OF THE DRAWINGS

The foregoing summary, as well as the following detailed description of the disclosure, will be better understood when read in conjunction with the appended drawings. For the purpose of illustrating the disclosure, there are shown in the drawings embodiments of lab ware inventory tracking and positioning devices which are presently preferred. It should be understood, however, that the disclosure is not limited to the precise arrangements and instrumentalities shown. In the drawings:

FIG. 4B—a top plan view of the cursor;

FIG. 4C—a cross-sectional view taken along line A-A of FIG. 4B showing the cursor;

DETAILED DESCRIPTION

Figure 1:
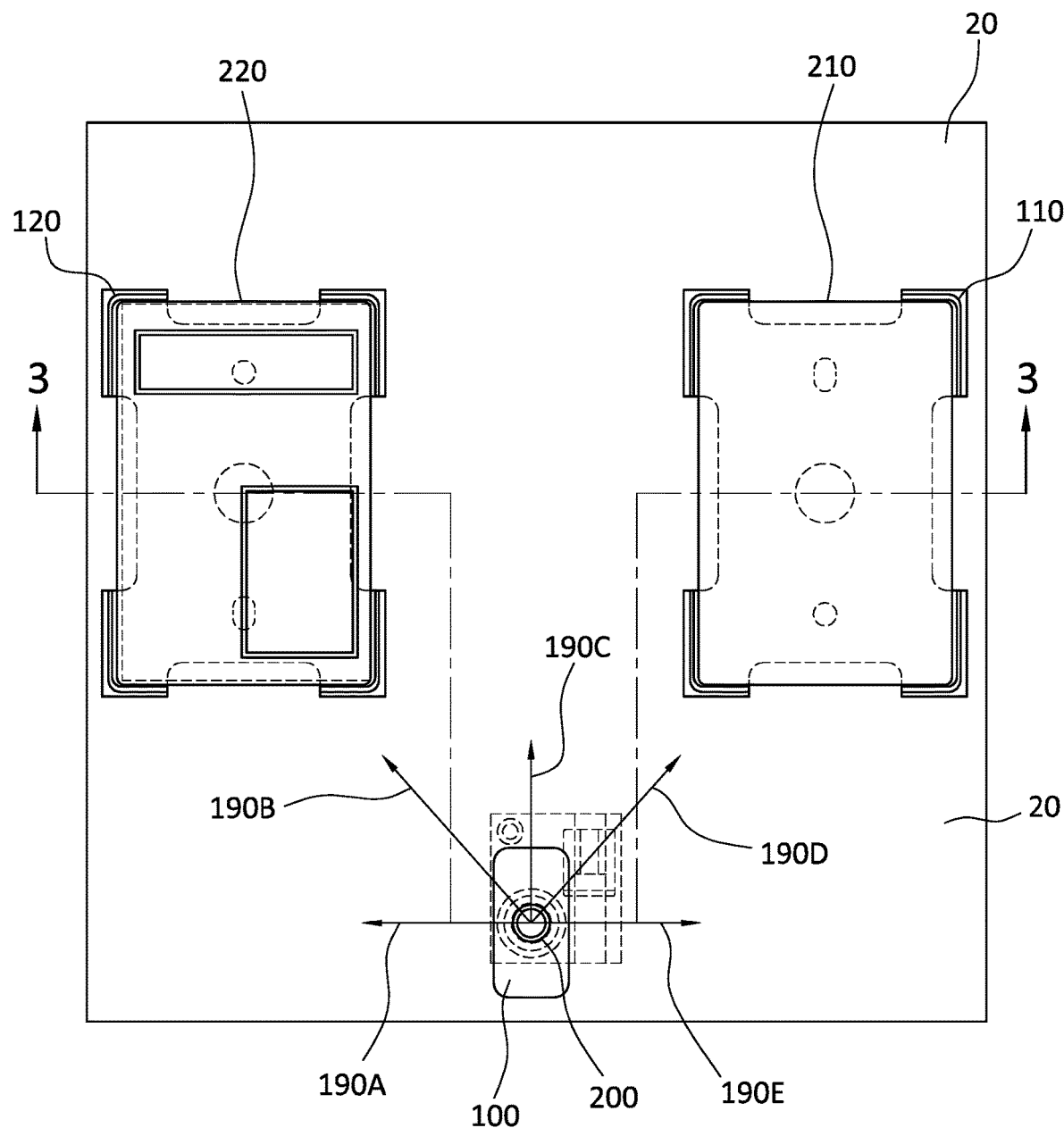
FIG. 1—Bird's eye view or top plan view of the deck of the labware inventory tracking and positioning device.

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

In this invention, magnetic robotic laboratory instrumentation and software may be used for managing, tracking, inventorying and positioning labware items on a flat deck, with no mechanical or physical manipulation of the labware items. The labware consists of tubes, microplates and trough type vessels containing samples and liquids used in assay of categories, but not limited to: forensic toxicology, pharmacological research, clinical diagnostics, food safety. The samples and liquids may include, but are not limited to, the following substances: blood, urine, oral fluids horticultural specimens, in-vitro products, and other biological specimens.

The labware inventory tracking and positioning devices 10 of the invention use carriers 100, 110, 120 to manipulate the labware, e.g., tubes 200, plates 210, troughs 220, and disposable tips (DITI), on a deck top surface 22. Each carrier 100, 110, 120 has a coin shaped, neodymium magnet 106, 116, 126 embedded in a respective recess 102, 112, 122 its base. The labware inventory tracking and positioning device of the invention uses neodymium magnets 106, 116, 126 in the carrier and a neodymium magnet 70 in the cursor 50 disposed below the deck bottom surface 24.

A neodymium magnet is a magnetic alloy that is composed of three elements—neodymium (Nd), iron (Fe), and boron (B). The N42 magnet has a diameter of 0.75" and a height of 0.20". Each magnet has two poles, a north and south pole—180 degrees from each other. The polarity helps orient the magnet. The north pole is attracted to the south pole and vice versa. The electromagnetic properties result from many turns of copper wire creating a solenoid (cylindrical coil of copper wire; becomes magnetic when electricity flows through the wire). Coil specifications are as follows:

Volts (Power Input): 24
Amperes (Electric Current): 0.17
Watts (Power Output): 4.11
Ohms (Resistance): 140
Inductance: 40.8 mH
Magnet Wire Gauge (thickness): 36
Number of Coil Turns: 1990
Inner Diameter: 0.5 inches
Outer Diameter: 0.87 inches
Coil Hook Up:
  Wire type: TFE
  Lead Wire gauge: 22
  Lead length: 18 inches FEMM 4.2 software was used to create, design, and test the magnets 70 that are used in the cursor 50. Permanent magnets 1" tall and 0.5" in diameter were drawn. The magnet 106, 116, 126 for the carrier 100, 110, 120 is designed to exist at a spacing distance of 0.75" from the cursor 50. To determine a desired spacing distance, a simulation was executed that integrated the magnetic field and gave the pull force between the two magnets, the magnet for the respective labware carrier and the magnet for the cursor. These numbers were used to narrow down the potential size of the magnets for the plate carrier. The distance or "air gap" between the permanent magnet 70 and the plate magnet 106, 116, 126 is about 0.75 inch, or a range of about 0.5 to about 0.8 inch, but that could change slightly because it is a floating cursor.

One permanent magnet 70 is housed inside of the cursor 50. In the cursor 50 there is a recess or cavity formed by a cavity 54 in the cursor block bottom 52 and a cavity 58 formed in the cursor block top 56. The electromagnet primarily sits in the cavity 54 in the cursor block bottom 52. The permanent magnet 70 inside the cursor 50 sits inside or is surrounded by a coil 80. When the coil 80 is in push mode having electrical current transmitted therein in a first direction of current flow, it drives the permanent magnet 70 upwardly in the direction of arrow 72 (See FIG. 3) so that a portion of the permanent magnet 70 enters into the cavity 58 in the cursor block top 56. When the coil 80 is in pull mode having electrical current transmitted therein in an opposite direction of current flow to the first direction, it pulls the permanent magnet 70 back down into the cavity 54 in the cursor block bottom 52. The design of the labware inventory tracking and positioning device of the invention is unique in that it utilizes the electromagnet coil 80 to drive the permanent magnet 70 of the cursor 50 up to engage and down to disengage with one of the magnets 106, 116, 126 on one of the carrier plates 100, 110, 120.

The cursor 50 is a core component of the labware inventory tracking and positioning device 10 according to the invention. The cursor housing (e.g., cursor block top 56 and cursor block bottom 52) preferably is made of the 3D printing material Acrylonitrile Butadiene Styrene (ABS). ABS is a thermoplastic material that is extremely strong and will stand up to the wear and tear of constant movement. There are four (4) primary pieces to the cursor—ABS plastic cursor block top 56, ABS plastic cursor block bottom 52, cursor permanent Neo Magnet 70, and cursor coil 80. In one embodiment, there is a thin layer of Acetal between the underneath or bottom surface 24 of the deck 20 substrate and adhered to the top surface of the ABS plastic cursor block top 56.

Figure 4A:
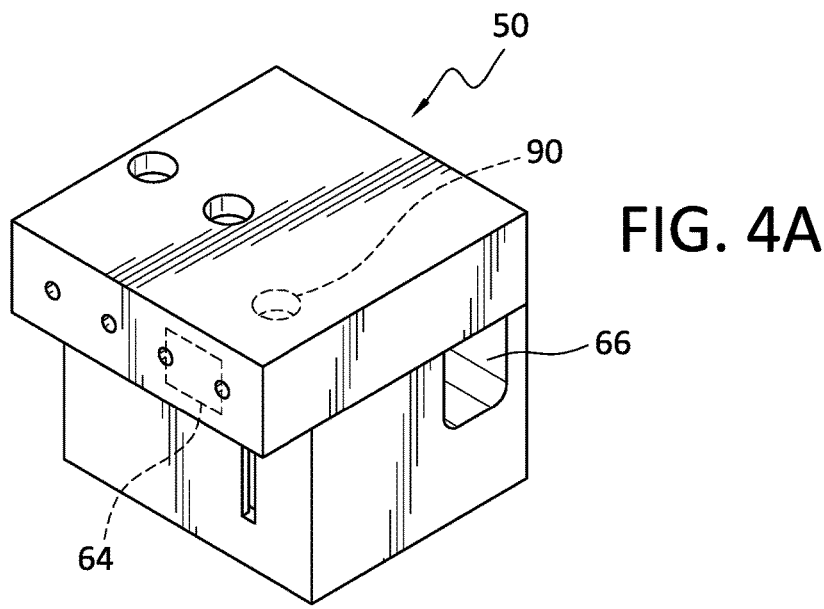
FIG. 4A—a right front perspective view of the cursor of the labware inventory tracking and positioning device.
Figure 4B:
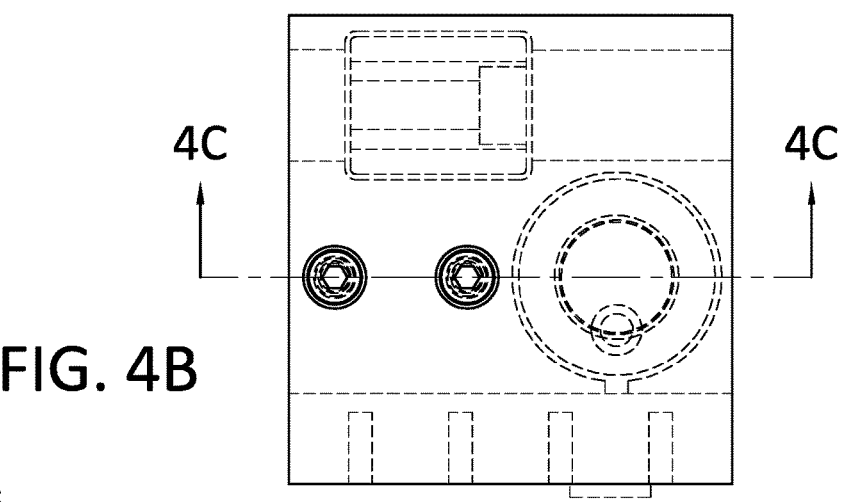

In a particularly preferred embodiment, the cursor block top 56 has a focus device 90 to concentrate a magnetic field up to the deck 20 for improved coupling with one of the magnets 106, 116, 126. (See FIG. 4A) The focus device 90 is made of metal and is ¼ inch in diameter by ¼ inch thick. It is embedded into the cursor block top 56. The focus device 90 corrals the default larger magnetic field and focalizes it into a smaller area.

The cursor block bottom 52 rests in the Y carriage 156 of the labware inventory tracking and positioning device 10. The cursor block bottom 52 preferably has a cooling device (not shown) to cool the coil 80).

Figure 5:
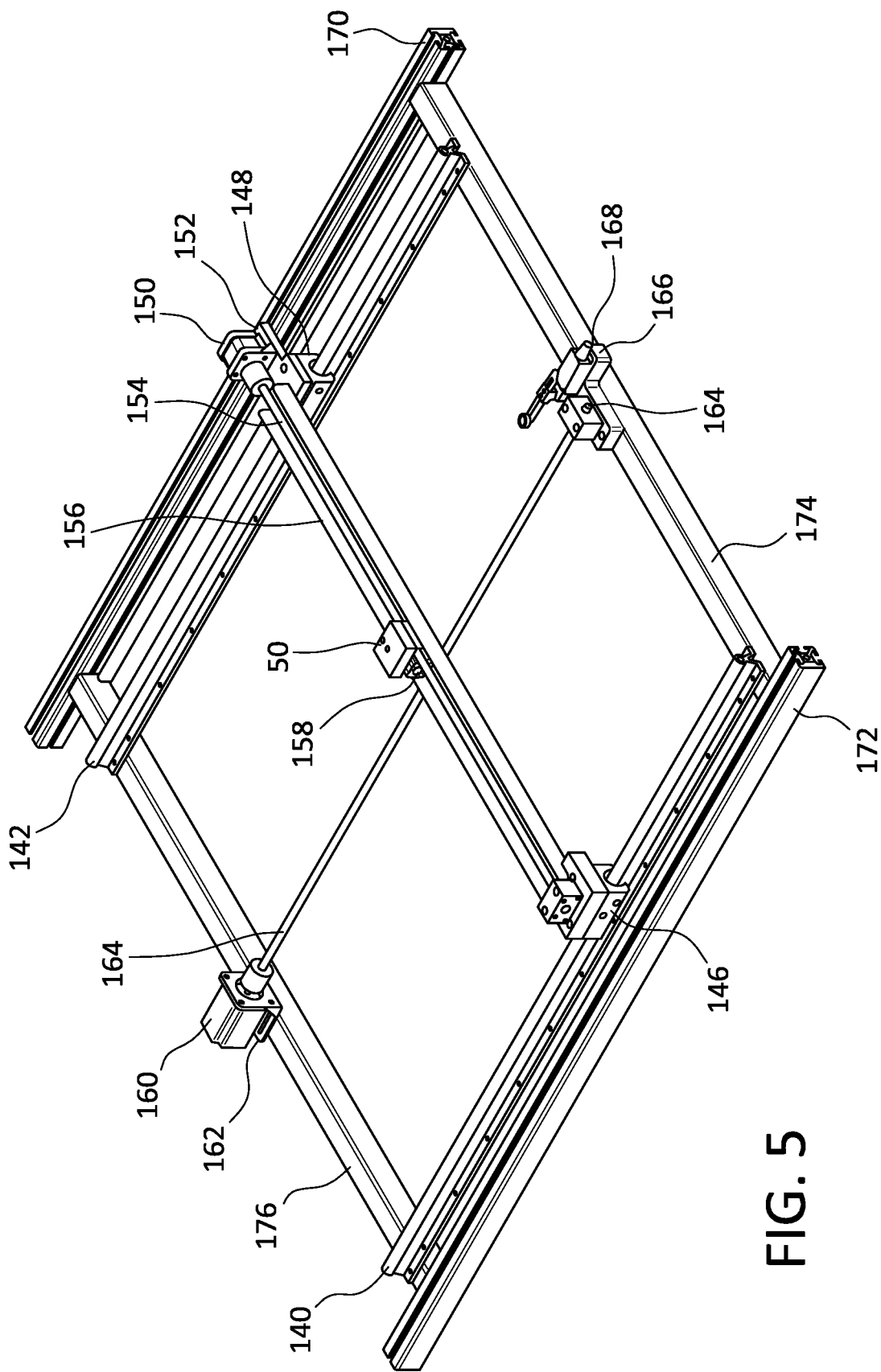
FIG. 5—a right front perspective view of the X-Carriage and Y-Carriage of the labware inventory tracking and positioning device.

The helical "lead" screw 154 of Y Carriage sits in an alcove 66 or through channel that exists in the cursor block bottom 52. (See FIGS. 3 and 5)

Figure 3:
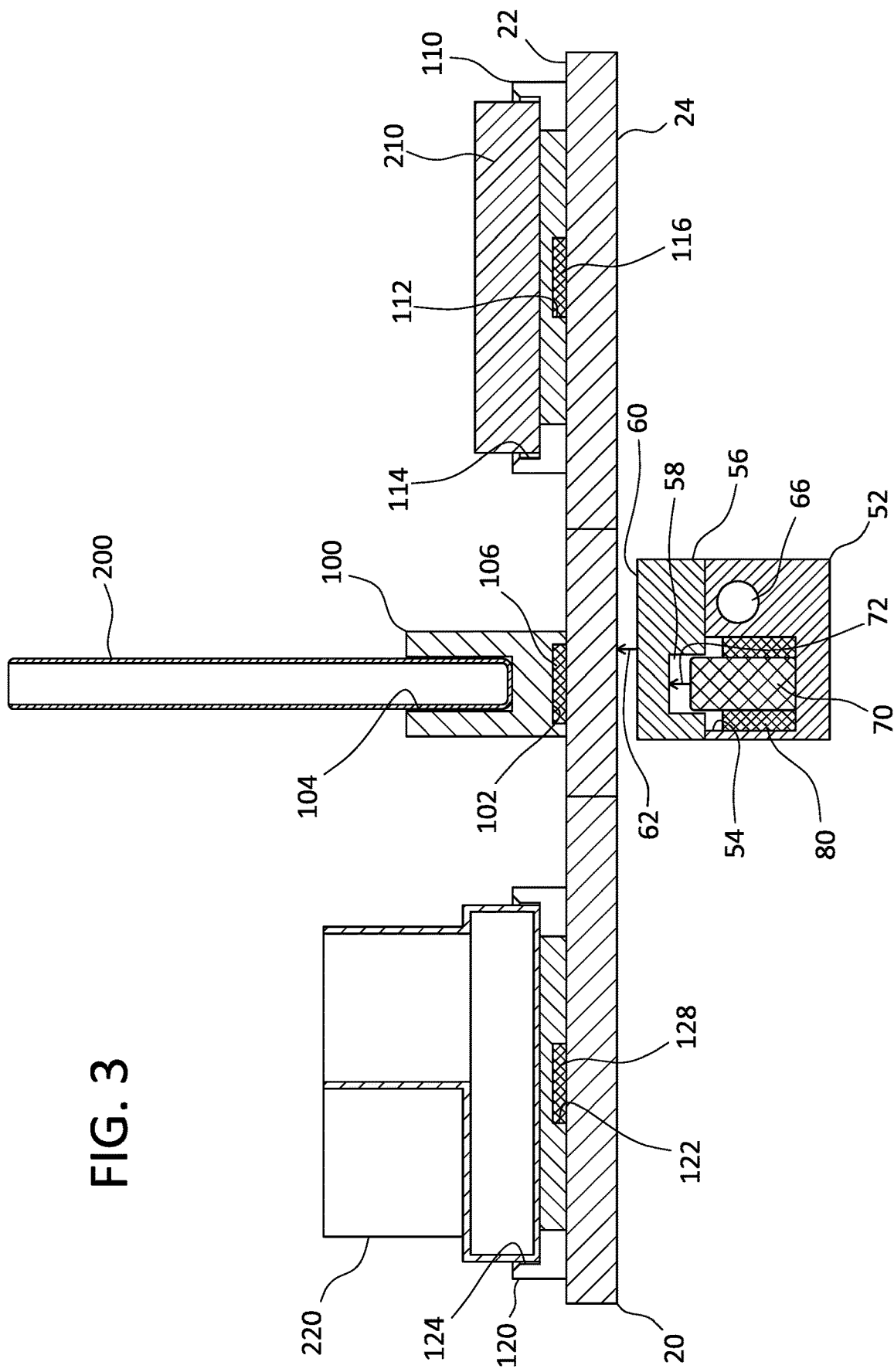
FIG. 3—cross sectional view taken along line A-A of FIG. 1 of the labware inventory tracking and positioning device having a deck substrate with the carriers located on top and the cursor block located under the substrate.
Figure 4C:
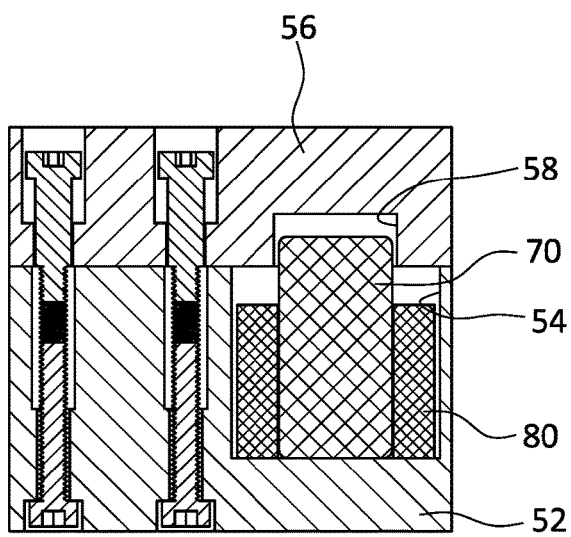

The cursor coil 80 wraps around at least a portion of the cursor permanent Neo Magnet 70 and the magnet 70 floats in a hole (e.g., cavities 54 and 58) that extends between the cursor block top 56 and cursor block bottom 52. See FIGS. 3 and 4C. The cavity hole 58 in the cursor block top 56 is only big enough for the floating magnet 70, not the coil 80—so the cursor coil 80 stays in the cavity 54 in the cursor block bottom 52 part. The cursor block bottom 52 part is attached to the Y carriage via the channel 156, with the lead screw in the Y-axis 154 seated in the channel 156. The cursor block top 56 or the top part of the cursor is a "floating cursor", meaning it maintains contact with the underneath half or bottom surface 24 of the deck 20 only when the cursor 50 is in "Push Mode". "Push Mode" means that the cursor coil 80 receives Positive 24V current flow. When the cursor coil 80 receives Positive 24V, part of the permanent magnet 70 propels into the cursor block top 56 and urges the cursor block top 56 upwardly in the direction of arrow 62 (FIG. 3). The top outer surface of the cursor block top 56 then touches the underneath or bottom surface 24 of the deck 20. "Pull Mode" releases the permanent Neo magnet 70 when the coil 80 gets Negative 24V to direct current in the opposite direction through the coil. This action pulls the permanent Neo magnet 70 back down into the cursor block bottom 52 part, releasing the magnetic pull.

X movement occurs when the helical "lead" screw 164 in the X Carriage twists either clockwise or counter-clockwise. (See FIG. 5) Home position is (0, 0) left/rear corner of the deck. Initialization is also known as the cursor home.

Figure 8:
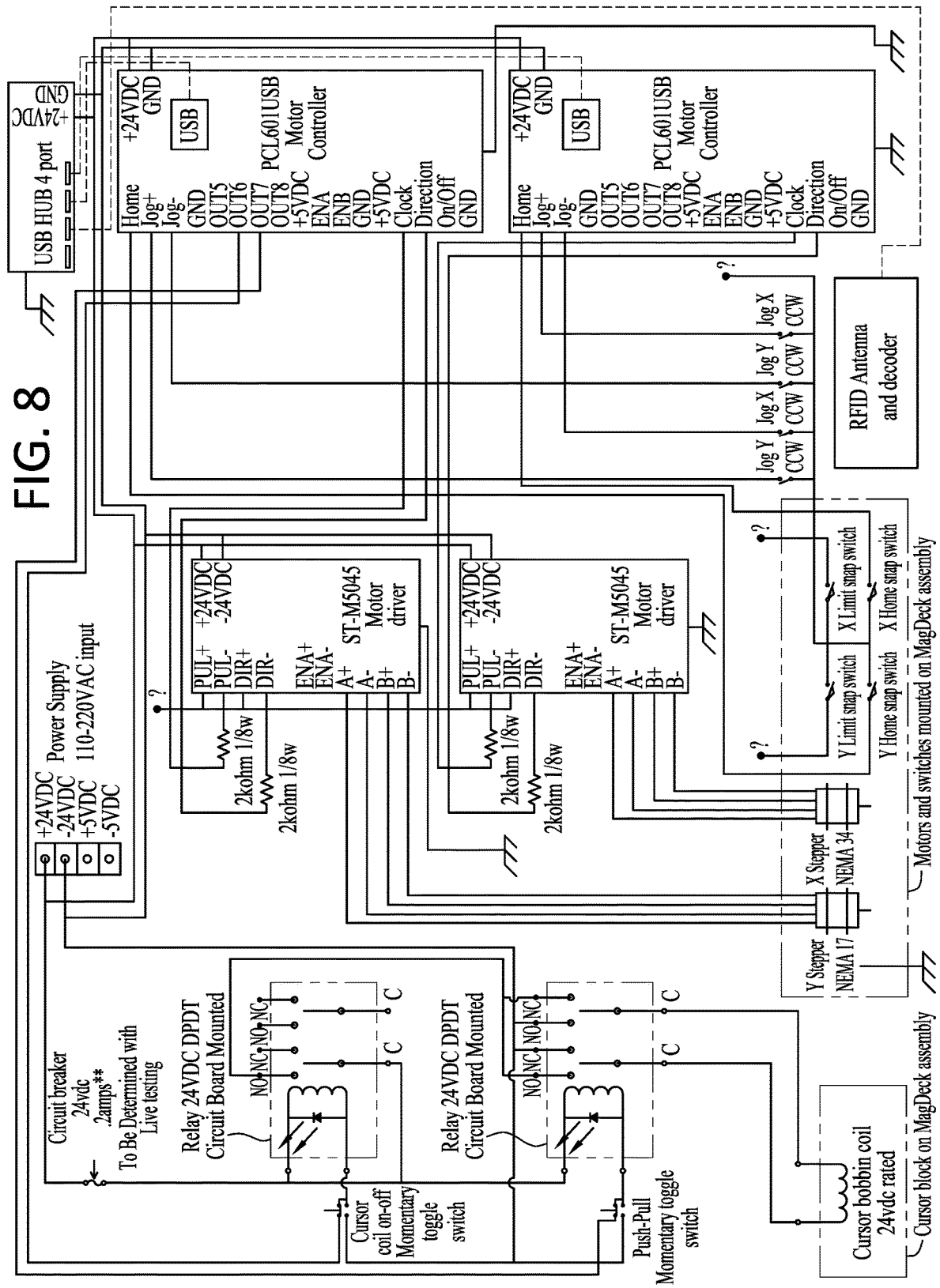
FIG. 8—a circuit diagram for circuitry to control the electrical coil and cooling device portion of the cursor block.

Proprietary circuitry such as shown in FIG. 8 is used to control the electrical coil 80 and cooling device portions of the cursor block 50. A module called the CCM is located inside the controller unit. The circuitry consists of two PCBs with each containing a DPDT relay (24 VDC) and a Red LED. Two DPDT momentary contact mini toggle switches are provided for manual override operation. All are mounted and connected in such a way that the module performs the control of the 24V DC power to activate the coil 80 for both PUSH/PULL and power ON/OFF, as well as to turn on the cursor cooling device when needed to cool the coil 80 inside the cursor block 50. The red LED and manual switches are for diagnostic purposes to show a technician if the relay is powered and functioning.

Relay #1 is used to turn ON/OFF the power to relay #2, as well as the cursor cooling circuit. Relay #2 is used in a configuration that reverses (flips) the polarity of the power being sent to the coil thus facilitating the PUSH/PULL functions.

Proprietary circuitry is used to allow the conductor software engine to control the X motor 160, Y motor 150 and activate the CCM PUSH/PULL and ON/OFF modes. A module called the XYM (XY Module) is located inside the controller unit. This circuitry consists of two stepper motor driver modules each connected to the stepper motors 150, 160 by four (4) leads. Two Stepper Controller modules, one for each axis, have their pulse and directional outputs connected to the stepper driver modules. Further, the Y Stepper motor controller has two of its outputs connected to the CCM inputs in such a way that the XYM performs the control of the 24V DC power which activates CCM for both PUSH/PULL and power ON/OFF and the cooling fan. A 24 volt DC power supply located in the controller provides power for the XYM and CCM.

The deck 20 of the labware inventory tracking and positioning device preferably is made from Acetal. This material was chosen because it has the lowest possible coefficient of friction which allows the carriers 100, 110, 120 to slide freely on the deck top surface 22. The material also has no effect on the magnetic field from either permanent magnet 70, 106, 116, 126. Acetal reduces the friction on the surface 22 of the deck 20 as well as the underneath surfaces of the carriers 100, 110, 120.

Advantages of the labware inventory tracking and positioning device of the invention result in:
  completely hands-free sample automation, i.e. place carriers on the deck surface and the device system runs the samples on itself
  No danger of injury to operator; and
  Ease of setup and teaching.

The inventive device allows for the movement and positioning operation for the labware carriers 100, 110, 120 to occur with no physical contact from above, or through the deck 20. The connection between the cursor 50 and one of the carriers 100, 110, 120 is magnetic. This is an improvement over present positioning devices that use overhead and swinging electromechanical gripping devices to access the labware carriers from above. The prior positioning devices also used motors and elements that present hazards to the lab operators, and required a great deal of programming and operational adjustment. The prior positioning devices also required higher mechanical energy levels that can cause injury to the operators.

Unlike some magnetically operated magnetic levitation devices, the magnetic coupling used with the labware inventory tracking and positioning device 10 of the invention allows for the labware 200, 210, 220 to move seamlessly in an X and Y motion with no vertical restrictions and no directional limitations. The labware carriers 100, 110, 120 are not restricted to a specific size, and any one carrier may be removed or added by the user at any location on the deck 20.

Figure 2:
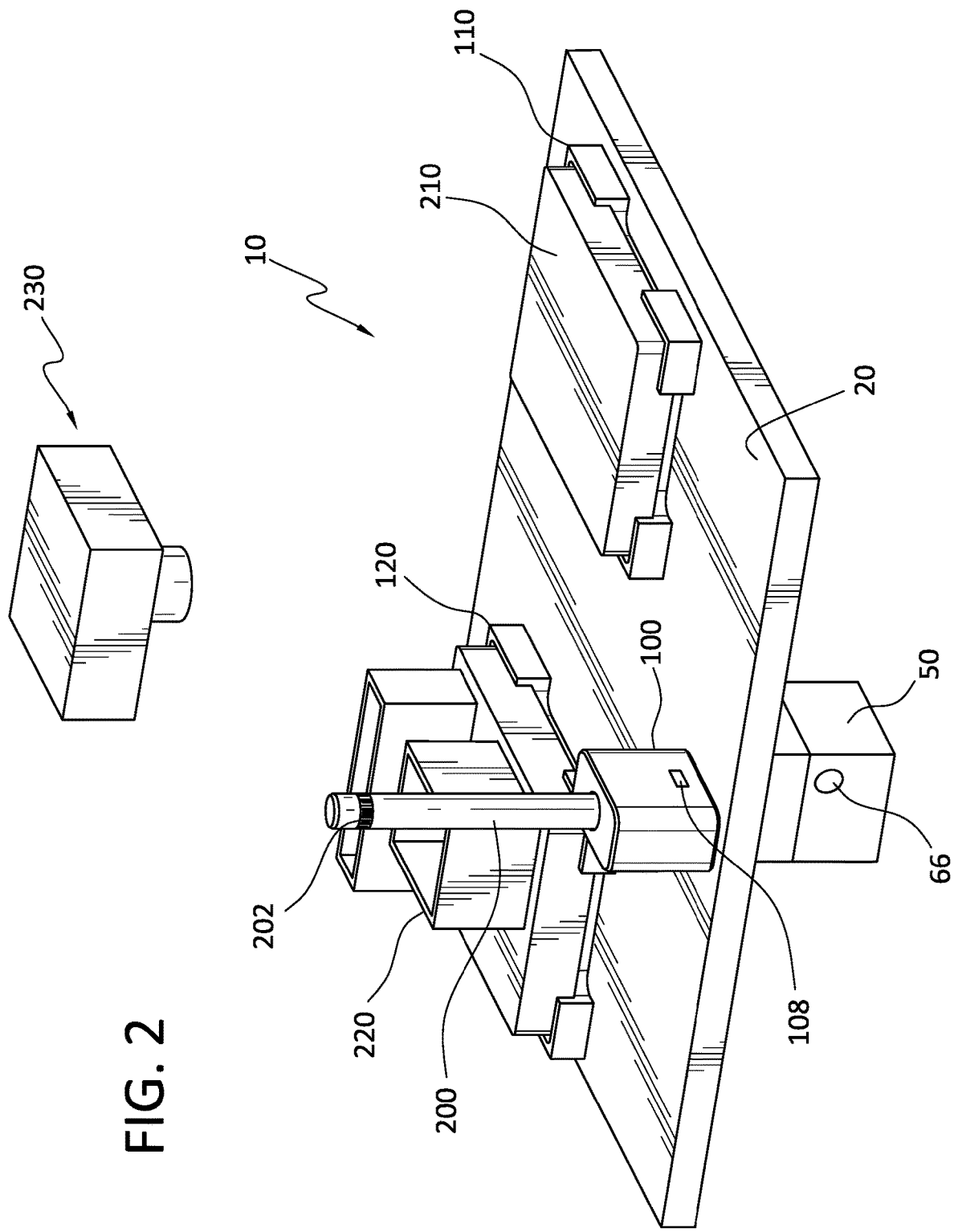
FIG. 2—a model view or right front perspective view of the labware inventory tracking and position device of FIG. 1, showing the carriers located on top of the deck substrate and the cursor located under the substrate.

Shown in FIGS. 1-3 is an embodiment of the labware inventory tracking and positioning device 10 with three different configurations of labware 200, 210, 220 to receive fluids held by carriers 100, 110, 120 that are movable on the deck top surface 22. The arrows 190A-E in FIG. 1 show that the carrier 100 for a test tube 200 is capable of moving in the X and Y direction, and any diagonal direction. This multi-directional movement is possible also for the other carriers 110, 120 shown in FIG. 1. Visible through the deck 20 is the "Cursor" device 50 used to capture the carrier 100 from below the deck 20 and move to a specified location utilizing magnetic coupling.

The cross-section drawing of FIG. 3 shows that the cursor 50 is located below the bottom surface 24 of the deck substrate 20 and never touches the carriers 100, 110, 120 that are located on and move with respect to the top surface 22 of the deck 20.

FIG. 2 shows a perspective view of the labware inventory tracking and positioning device 10 with three different labware carriers—a vessel carrier 120, a test tube carrier 100 and an MTP plate carrier 110, at different locations on a top surface 22 of the deck 20. The cursor block assembly 50 is located under the deck substrate surface, e.g., under the bottom surface 24 of the deck 20. There is no mechanical or physical connection from the cursor 50 to any of the carriers 100, 110, 120. The "connection" is by magnetic attraction, such that movement of the cursor 50 effects movement of the individual carrier 100 (FIG. 1) to which it is "connected" as explained in more detail below.

The movement of the selected carrier present on top of the deck substrate surface is performed by utilizing "magnetic coupling" between the cursor block 50 below, and the carrier 100, 110, 120 above, the deck substrate surface 22. The cylindrical permanent magnet 70 located inside the cursor 50 is pushed up, using electrical energy sent to the electromagnet coil 80 in a polarity that repulses the permanent magnet 70 upward in the cursor block 50, to a point where the top surface 60 of the cursor block top 56 becomes close to the underside or bottom surface 24 of the deck 20 and couples with the permanent magnet 106, 116, 126 located in the base of the carrier 100, 110, 120. This couples the cursor permanent magnet 70 to the carrier magnetically. The cursor 50 is then moved using stepper motors 150, 160 and lead screws 154, 164 in an X- and Y-direction as directed by software commands in scripts and operating programs to relocate to a desired X-Y position on the deck 20.

After movement to a desired location is complete, the polarity of the electro magnet 80 is reversed so the cylindrical magnet 70 is pulled down away from the deck 20, and this decouples the magnet 106, 116, 126 from the carrier 100, 110, 120 above. This pulled state allows the cursor 50 to move freely under the carriers 100, 110, 120 until it is positioned at another carrier 100, 110, 120 selected to be relocated.

During operation, the cursor block top 56 (top part or cap of the cursor 50) is designed to move up and down as needed. By moving the cursor block top 56 of the cursor 50 via the magnetic coupling, the operator may (1) prevent unwanted magnetic coupling with carriers 100, 110, 120; (2) keep the cursor out of contact with the underside of the deck when not in push mode; (3) allow more cooling ventilation during operation as there is a gap allowing air flow between the cursor top part and the underside of the deck when not in push mode; and (4) allow the cursor to freely follow the contour of the underside or bottom surface 24 of the deck 20 during pushed movement.

Tracking and inventory of the carriers and labware is done by embedded RFID devices 108 in each carrier, and operator provided bar code labels 202 on the labware itself. An individual barcode is read by a laser barcode reader (not shown) when the labware item and carrier are loaded at the loading site. Any carrier added or removed by an operator is tracked, and the inventory of carriers on the deck is updated. Inventory and position information also is updated during and after any moves performed by the cursor. An RFID reader 64 is attached to the cursor top to read the RFID chip 108 embedded in the carrier 100.

Optionally, overhead High-Def color cameras 230 use optical recognition software to observe the carriers on the deck to monitor and report location changes for changes in inventory or location.

Figure 6:
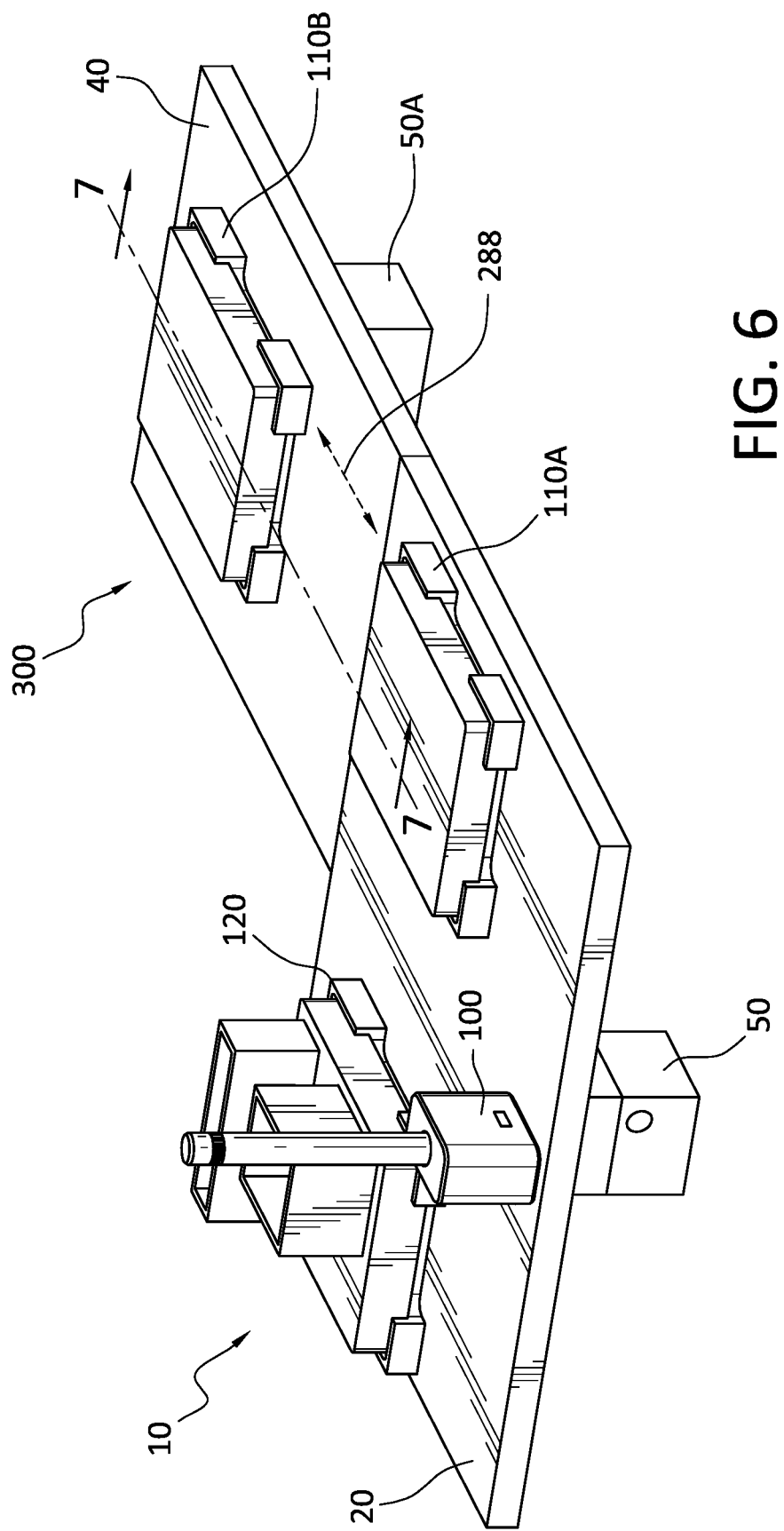
FIG. 6—a right front perspective view of an optional transfer table used in cooperation with the labware inventory tracking and positioning device.

Preconfigured in SQL database.
   Guideway (not guide)
   Path
   Route
   Moves
   Loading Location(s)
   Unloading Location(s)
Stored Real-time in SQL Database
   Present (X, Y) Location of Cursor
   All (X, Y) locations of following:
   RFID Chip of Carrier
   Item on Carrier
   Barcode on Item Referring next to FIGS. 6 and 7, a transfer option or extender 300 is shown to transfer a carrier (e.g. 100, 110A, 110B, 120) from the deck 20 top surface to a receiving area or working area, such as a pipetting location. The transfer option 300 sits on the instrument deck surface 290 and extends over the back of deck 20 to mate with the rear deck of the labware inventory tracking and positioning device. With the transfer option 300, the cursor 50 is moved away from the extender 300. A second cursor 50A is able to move a carrier (e.g., 110A) from the top deck surface 22 of the labware inventory tracking and positioning device 10 to an adjacent location in the direction of arrow 288, such as to a pipetting location, by movement on an extender deck surface 40 or overhang provided with the transfer option. In the embodiment of FIG. 6, the transfer option can hold three micro plates in landscape orientation.

Figure 7:
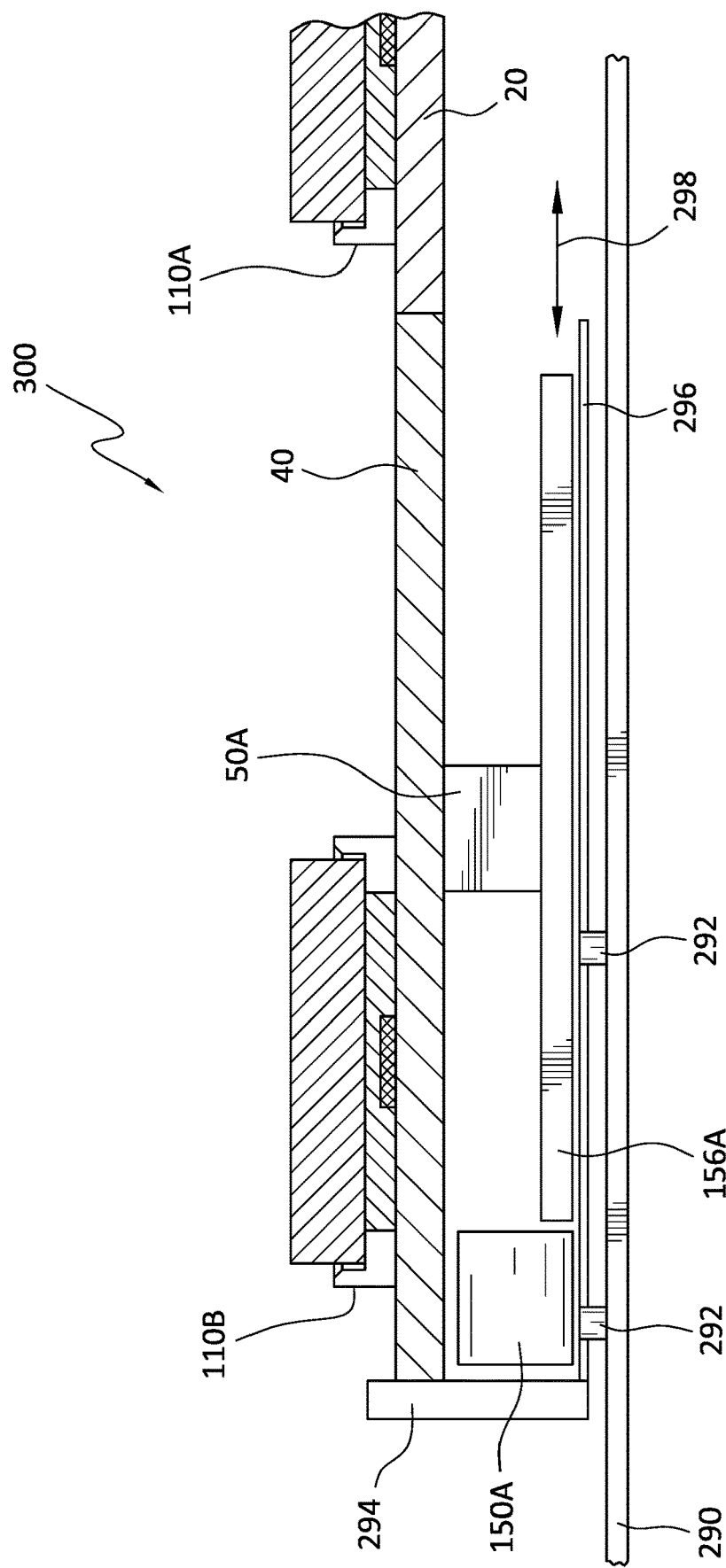
FIG. 7—a cross-sectional view taken along line 7-7 of FIG. 6 showing additional structure of the optional transfer table.

Referring to FIG. 7, the transfer option consists of a base plate 296, a three-sided side rail frame 294, and a deck surface 40, such as an approximately 1 meter long and ½ inch thick Delrin deck. The deck 40 is rabbited to slide into a top inside channel of the side frames 170, 172 such as in the directions of double-sided arrow 298 in FIG. 7. The base plate 296 of 3/16 inch aluminum is attached to inside bottom of side rails and notched to fit firmly on deck pins 292.

A second standard Y carriage assembly is used with the transfer option. The second Y carriage assembly has a stepper motor 150A, a lead screw, limit switches, and a second cursor 50A. The second Y carriage assembly is mounted on a linear bearing rail 156A which is mounted to the base plate 296. This allows for the entire second Y carriage assembly to slide out the back in Y-extended motion to extend the range of the Y motion of the second cursor 50A. Providing the Y-extended motion allows the second cursor 50A to travel under the deck 20 of the labware inventory tracking and positioning device to capture a labware carrier, and retract to clear the labware inventory tracking and positioning device under deck space.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

GLOSSARY OF TERMINOLOGY

Acetal—Polyoxymethylene also known as Delrin™.
Carrier—Low friction holder of labware.
CCC—Cursor Control Circuit
CCM—Cursor Control Module
Coil—A plastic, or other non-metallic circular spool with a specific size and type of insulated wire wrapped around it for specific number of turns.

Conductor—Proprietary circuitry is used to allow the Mag-Deck™ Conductor software to control the X motor, Y Motor and activate the CCM PUSH/PULL and ON/OFF modes.

Cooling Device—Closed Liquid Loop with Fan Cooled Radiator.

Cursor—Device that is pointed to a specific XY coordinate

DC—Direct current is the unidirectional flow or movement of electric charge carriers (which are usually electrons).

DPDT—Double Pole Double Throw relay. The relay is an electromagnetic device used to separate two circuits electrically and then connect them magnetically. They are often used to interface an electronic circuit, which works at a low voltage to an electrical circuit which works at a high voltage or an isolated circuit.

FEMM 4.2—program that allows you to solve magnetic, electrostatic, heat flow and current flow problems on two-dimensional planar and axis symmetric domains. 4.2 refers to the release of software Guide—physical aluminum channel metal strips on top of deck.

Guide Pontoon—Custom Acetal/low friction guide ends.

Guideway—two guides parallel creates a guideway.

Lane—path which is only used for plate movement, not storage, like the left highway lane.

Lead—A wire or other conductor typically insulated to prevent electrical energy to leak.

LED—Light emitting diode

Load Point (SITE)—load carrier spot.

Move—direct line (x1, y1) to (x2, y2).

Paths—straight line of clear access of (x1, y1) to (x2, y2) down center of guideway.

PCB—Printed Circuit Board

Permanent Magnet—should produce a high magnetic field with a low mass, and should be stable against the influences which would demagnetize it. The desirable properties of such magnets are typically stated in terms of the remanence and coercivity of the magnet materials.

Rear Connection Point—allows for carriers to move to future MagDeck™ equipment and other robots. (See FIG. 6)

Relay—an electrically operated switch. Many relays use an electromagnet to mechanically operate a switch, but other operating principles are also used, such as solid-state relays. Relays are used where it is necessary to control a circuit by a separate low-power signal, or where several circuits must be controlled by one signal.

Routes—a combination/set of moves using paths to make a sequential move.

Site—a designated/dedicated (x, y) location for loading/unloading/storage. Loading and Unloading sites are a designated spot on deck—two different spots on deck.

Stepper Motor—or step motor or stepping motor is a brushless DC electric motor that divides a full rotation into a number of equal steps.

Stepper Motor Controller—The controller sends the stepper motor driver the commands to rotate a specific incremental distance per each step. The number of steps that are executed controls the degree of rotation of the motor's shaft.

Stepper Motor Driver—provide stepper motors with electrical energy to make precise mechanical motion.

Unload Point (SITE)—unload spot (predefined).

V—Volt; a measurement of electrical energy amplitude

VDC—Volts Direct Current

XYM—XY Module

The invention claimed is:

1. A lab ware inventory tracking and positioning device, comprising:
a deck having a planar or substantially planar top deck surface with a desired coefficient of friction, and having a bottom surface opposite the top deck surface;
at least one carrier for receiving a lab ware item, said at least one carrier having a carrier magnet therein or thereon;
a first guide bar disposed below the bottom surface of the deck;
a second guide bar disposed below the bottom surface of the deck and positioned perpendicularly to the first guide bar;
a cursor joined for movement along at least a portion of the length of the first guide bar, said cursor having a top part disposed over a bottom part, with said top part vertically movable between a push position and a pull position, said top part defining a cavity to receive a top portion of a cursor magnet, said bottom part defining a cavity to receive the cursor magnet and a coil around a bottom portion of the cursor magnet, wherein the top part of the cursor contacts the bottom surface of the deck when in the push position, and wherein a gap is established between the top part of the cursor and the bottom surface of the deck when in the pull position, so that the cursor magnet and the carrier magnet experience magnetic field attraction force through the thickness of the deck when the cursor is in the push position, and the carrier is movable upon the top deck surface in X-Y directions in direct relation to positions of the cursor in X-Y directions below the deck, and so that the cursor magnet and the carrier magnet experience magnetic field repulsive force when the cursor is in the pull position, such that the carrier no longer is movable in direct relation to the positions of the cursor below the deck;
a source of electrical current to the coil in a first direction, with said electrical current reversible to the opposite direction;
a first motor coupled to the cursor or a carriage therefor for controlling X-direction movement of the cursor; and
a second motor coupled to the cursor or the carriage therefor for controlling Y-direction movement of the cursor.

2. The lab ware inventory tracking and positioning device of claim 1, further comprising a material of desired coefficient of friction applied or joined to the top part of the cursor.

3. The lab ware inventory tracking and positioning device of claim 2, wherein the material of desired coefficient of friction is acetal.

4. The lab ware inventory tracking and positioning device of claim 1, further comprising a focus device to concentrate magnetic field to the deck.

5. The lab ware inventory tracking and positioning device of claim 1, further comprising a cooling device to cool the coil held in the cursor.

6. The lab ware inventory tracking and positioning device of claim 5, wherein the cooling device is a closed liquid loop fluidly connect to a fan cooled radiator.

7. The lab ware inventory tracking and positioning device of claim 1, wherein the first motor is a stepper motor.

8. The lab ware inventory tracking and positioning device of claim 1, wherein the second motor is a stepper motor.

9. The lab ware inventory tracking and positioning device of claim 1, wherein the carrier magnet is a permanent magnet.

10. The lab ware inventory tracking and positioning device of claim 9, wherein the carrier magnet is a neodymium magnet.

11. The lab ware inventory tracking and positioning device of claim 1, wherein the cursor magnet is a permanent magnet.

12. The lab ware inventory tracking and positioning device of claim 11, wherein the cursor magnet is a neodymium magnet.

13. The lab ware inventory tracking and positioning device of claim 1, wherein the deck surface is formed of acetal.

14. The lab ware inventory tracking and positioning device of claim 1, wherein the at least one carrier is adapted to receive one or more lab ware items, said lab ware items selected from the group consisting of test tubes, tubes, microplates, trough-type vessels, and disposable tips.

15. The lab ware inventory tracking and positioning device of claim 1, further comprising an extender removably attachable to the deck to extend either the length or the width of the deck.

16. The lab ware inventory tracking and positioning device of claim 1, further comprising means for controlling the source of electrical current to the coil.

17. The lab ware inventory tracking and positioning device of claim 1, further comprising means for controlling the first motor and the second motor.

18. The lab ware inventory tracking and positioning device of claim 1, further comprising an RFID device embedded in or attached to the at least one carrier, and an RFID reader associated with the cursor.

19. The lab ware inventory tracking and positioning device of claim 1, further comprising a camera disposed above the top deck surface.

\* \* \* \* \*